US006475275B1

(12) United States Patent
Nebesnak et al.

(10) Patent No.: US 6,475,275 B1
(45) Date of Patent: Nov. 5, 2002

(54) CEMENT COMPOSITION

(75) Inventors: Edward Nebesnak, Mine Hill; Robert Ostertog, Bloomfield, both of NJ (US)

(73) Assignee: Isolatek International, Stanhope, NJ (US)

( * ) Notice: Subject to any disclaimer, the term of this patent is extended or adjusted under 35 U.S.C. 154(b) by 0 days.

(21) Appl. No.: 09/422,886

(22) Filed: Oct. 21, 1999

(51) Int. Cl.$^7$ .......................... C04B 14/00; C04B 24/00

(52) U.S. Cl. ...................... 106/803; 106/694; 106/698; 106/716; 106/718; 106/719; 106/720; 106/773; 106/774; 106/823; 427/403; 427/427

(58) Field of Search .................. 106/694, 698, 106/716, 718, 719, 720, 773, 774, 803, 823; 427/403, 427

(56) References Cited

U.S. PATENT DOCUMENTS

| 136,681 | A | | 3/1873 | Van Zandt et al. |
|---|---|---|---|---|
| 288,935 | A | | 11/1883 | Fowler |
| 658,590 | A | | 9/1900 | Robinson |
| 1,844,662 | A | | 2/1932 | King |
| 1,951,691 | A | | 3/1934 | Coxon |
| 1,954,378 | A | | 4/1934 | Day |
| 2,017,022 | A | | 10/1935 | Roos |
| 2,216,555 | A | | 10/1940 | King et al. |
| 2,297,549 | A | | 9/1942 | Friedlaender |
| 2,322,194 | A | | 6/1943 | King |
| 2,364,344 | A | | 12/1944 | Connell et al. |
| 2,820,714 | A | | 1/1958 | Schneiter |
| 2,853,394 | A | | 12/1958 | Riddell et al. |
| 3,035,940 | A | | 5/1962 | Hobson |
| 3,042,316 | A | | 7/1962 | Hobson |
| 3,077,415 | A | | 2/1963 | Ayres |
| 3,522,069 | A | | 7/1970 | Checko et al. |
| 3,565,647 | A | | 2/1971 | Magder |
| 3,616,173 | A | * | 10/1971 | Green et al. ................. 428/331 |
| 3,634,136 | A | | 1/1972 | French et al. |
| 3,656,985 | A | | 4/1972 | Bonnel et al. |
| 3,719,513 | A | | 3/1973 | Bragg et al. |
| 3,725,095 | A | | 4/1973 | Weidman et al. |
| 3,729,328 | A | | 4/1973 | Madger |
| 3,730,744 | A | | 5/1973 | Yavorsky |
| 3,754,683 | A | | 8/1973 | Broadfoot |
| 3,754,685 | A | | 8/1973 | Kauppi |
| 3,758,034 | A | | 9/1973 | Broadfoot |
| 3,767,436 | A | | 10/1973 | Peppler et al. |
| 3,778,304 | A | | 12/1973 | Thompson |
| 3,839,059 | A | | 10/1974 | Rothfelder et al. |
| 3,879,209 | A | | 4/1975 | Limes et al. |
| 3,883,359 | A | | 5/1975 | Harvey |
| 3,912,838 | A | | 10/1975 | Kraus et al. |
| 3,923,534 | A | | 12/1975 | Cassidy |
| 3,926,650 | A | | 12/1975 | Lange et al. |
| 3,929,692 | A | | 12/1975 | Offerman |
| 3,963,849 | A | | 6/1976 | Thompson |
| 3,969,453 | A | | 7/1976 | Thompson |
| 3,972,723 | A | | 8/1976 | Ballé et al. |
| 4,042,745 | A | | 8/1977 | Cornwell et al. |
| 4,046,584 | A | | 9/1977 | Snyder et al. |
| 4,066,469 | A | | 1/1978 | Shiel et al. |
| 4,066,471 | A | | 1/1978 | Burke |
| 4,077,809 | A | | 3/1978 | Plunguian et al. |
| 4,088,804 | A | | 5/1978 | Cornwell et al. |
| 4,088,808 | A | | 5/1978 | Cornwell et al. |
| 4,094,693 | A | | 6/1978 | Knorre et al. |
| 4,114,384 | A | | 9/1978 | Kennedy-Skipton |
| 4,157,264 | A | | 6/1979 | Kennedy-Skipton |

(List continued on next page.)

FOREIGN PATENT DOCUMENTS

| CA | 975482 | | 9/1975 |
|---|---|---|---|
| DE | 1646890 | | 12/1966 |
| DE | 2439774 | | 8/1974 |
| DE | 3527978 A1 | | 8/1985 |
| DE | 3537274 A1 | | 10/1985 |
| DE | 4205354 | * | 8/1993 |
| EP | 0012546 A2 | | 6/1980 |
| EP | 0 038126 A1 | | 10/1981 |
| FR | 2085402 | | 4/1970 |
| GB | 1104419 | | 2/1968 |
| GB | 1127296 | | 9/1968 |
| GB | 2 033 367 A | | 5/1980 |
| GB | 2 035 992 A | | 6/1980 |
| GB | 2 111 041 A | | 6/1983 |
| GB | 2 140 794 A | | 12/1984 |
| GB | 2 145 940 A | | 4/1985 |
| JP | 53-84320 | | 7/1978 |
| JP | 53-28052 | | 8/1978 |
| JP | 54-73825 | | 6/1979 |
| JP | 60-112676 | | 6/1985 |
| JP | 10-036838 | * | 2/1998 |
| PL | 46419 | | 11/1962 |
| WO | WO 82/04038 | | 11/1982 |
| WO | WO 83/01615 | | 5/1983 |
| WO | WO 83/02938 | | 9/1983 |
| WO | WO 85/02396 | | 6/1985 |

OTHER PUBLICATIONS

"Zonolite® Mine Sealant; The new, improved method of coating mine strata", Grace Construction Products, Oct., 1974.

"Standard Specifications for Vermiculite Plastering and for Vermiculite Acoustical Plastic", Vermiculite Institute, Mar., 1956.

"Effects of Accelerators and Retarders on Calcined Gypsum", F. C. Welch, Jour. Amer. Ceramic Soc., vol. 6, pp. 1179, 1923 (no month).

"Accelerators and Retarders for Calcined Gypsum", M. C. Bailey, date unknown.

(List continued on next page.)

Primary Examiner—Anthony J. Green
(74) Attorney, Agent, or Firm—Brinks Hofer Gilson & Lione

(57) ABSTRACT

A cement composition contains 35–85% by weight of a cement, 3–15% by weight of a clay, 1–50% by weight of an aggregate and/or a fibrous material, and 0.2–5% by weight of a high efficiency retarder. A benefit of the present invention is that equipment used to apply cement compositions need not be cleaned every night when used on a construction site.

18 Claims, No Drawings

U.S. PATENT DOCUMENTS

| | | | |
|---|---|---|---|
| 4,159,302 A | * 6/1979 | Greve et al. ............... 264/333 |
| 4,166,749 A | 9/1979 | Sterrett et al. |
| 4,178,273 A | 12/1979 | Brown |
| 4,210,457 A | 7/1980 | Dodson et al.. |
| 4,249,950 A | 2/1981 | Hurst |
| 4,254,177 A | 3/1981 | Fulmer |
| 4,262,055 A | 4/1981 | Russell et al. |
| 4,264,367 A | 4/1981 | Schutz |
| 4,264,368 A | 4/1981 | Schutz |
| 4,293,341 A | 10/1981 | Dudley et al. |
| 4,306,395 A | 12/1981 | Carpenter |
| 4,310,486 A | 1/1982 | Cornwell et al. |
| 4,355,060 A | 10/1982 | Cornwell |
| 4,357,167 A | * 11/1982 | Kellet et al. ............... 106/694 |
| 4,366,209 A | 12/1982 | Babcock |
| 4,367,247 A | 1/1983 | Akerberg |
| 4,391,647 A | 7/1983 | Deer et al. |
| 4,419,133 A | 12/1983 | Shubow et al. |
| 4,492,766 A | 1/1985 | Zverina et al. |
| 4,495,228 A | 1/1985 | Cornwell |
| 4,503,109 A | 3/1985 | Shubow et al. |
| 4,642,137 A | * 2/1987 | Heitzmann et al. ......... 106/607 |
| 4,661,161 A | 4/1987 | Jakacki et al. |
| 4,699,822 A | 10/1987 | Shu |
| 4,721,659 A | 1/1988 | Tieckelmann et al. |
| 4,732,781 A | 3/1988 | Babcock et al. |
| 4,732,782 A | 3/1988 | Babcock et al. |
| 4,751,024 A | 6/1988 | Shu et al. |
| 4,772,327 A | 9/1988 | Allemann et al. |
| 4,804,563 A | 2/1989 | Hillemeier et al. |
| 4,865,887 A | 9/1989 | Virtanen |
| 4,904,503 A | 2/1990 | Hilton et al. |
| 4,934,596 A | 6/1990 | Hilton et al. |
| 5,989,336 A | * 11/1999 | Carpenter et al. .......... 106/811 |
| 6,162,288 A | 12/2000 | Kindt et al. ............. 106/18.11 |

OTHER PUBLICATIONS

"Gypsum Construction Handbook", 2$^{nd}$ Ed., USG Corporation, pp. 68–69; pp. 195–196, date unknown.

"The Nature of the Changes Involved In The Production And Setting of Plaster of Paris", Jour. Of Society of Chemical Industry, No. 13, vol. XXVI, Jul. 15, 1907.

"Mandoseal", Austin Industrial Coatings Corp., date unknown.

"Coal Mine Sealants", Lawrence Artler, May 8, 1974.

"Chemical and process technology encyclopedia", Douglas M. Considine, p. 567, 1974 (no month).

"Rocks and Rock Minerals", Third Edition, Louis V. Pirsson, p. 258, data unknown.

"Material Safety Data Sheet Product Group: Ground Limestone, Marble Falls Products", J.M. Huber Corp., pp. 1–3, date unknown.

"Concise Chemical and Technical Dictionary", Third Enlarged Edition, H. Bennett, F.A.I.C, p. 826, 1974 (no month).

"Gypsum Construction Handbook", United States Gypsum Company, pp. 284–285, 288–289, 434–435, and 440–441, 1987 (no month).

"Monokote Fireproofing", Grace Construction Products, date unknown.

"Plastering Skills", F. Van Den Branden et al., pp. 80–81 and 115, 1984 (no month).

"Plaster Mixing Procedures", Tooling & Casting Division, United States Gypsum, date unknown.

"Fire Resistance Directory", Underwriters Laboratories Inc., pp. 498–499, (Jan., 1988).

"Standard Specifications for Vermiculite Plastering and for Vermiculite Acoustical Plastic for Sound–Conditioning", Vermiculite Institute, pp. 3–11 (Jun., 1963).

Quickspray, Inc., letter to Southwest Vermiculite and drawing, "Quickspray Heavy Duty Carrousel Pump with Catalyst System", Aug. 24, 1992.

"E–Z–Spray", Essick, date unknown.

"HP Shotcrete Assembly, HPS Admixture Pump Assembly, HPS Shotcrete Accelerator", Gilbertson Shotcrete Specialties, date unknown.

"Veneer Plaster", International Association of Wall & Ceiling Contractors, Gypsum Association, 1974 (no month).

"Red Book—Lathing and Plastering Handbook", 28th Edition, United States Gypsum Company, pp. 90–91, 1972 (no month).

"Industrial Chemistry, an elementry treatise for the student and general reader", Fifth Edition, Emil Raymond Riegel, Ph.D., pp. 174–175, 1949 (no month).

"Gypsum, A Chapter from Mineral Facts and Problems", Harold J. Schroeder, Bureau of Mines, pp. 1039–1048, 1970 Edition (no month).

"The Chemical Process Industries", Second Edition, R. Norris Shreve, pp. 202–203 and 218–219, 1956 (no month).

"Standard Specification for Gypsum Plasters", p. 35, date unknown.

"Foamed Plaster", vol. 61, pp. 1597–1598, date unknown.

* cited by examiner

CEMENT COMPOSITION

BACKGROUND OF THE INVENTION

The present invention relates to cement compositions, and methods of making and using these compositions.

Cement slurries are often applied to metal structural members in order to provide a fire-resistant coating. Products in this field include gypsum-based formulations that contain gypsum as a binder, a lightweight inorganic aggregate, such as vermiculite, a fibrous substance such as cellulose, and an air-entraining agent. The slurries are generally prepared at ground level, pumped to the point of application at the constructions site, and then applied through a spray nozzle. It is also possible to add an acidic accelerating agent, via a spray nozzle, into the composition at a point just prior to application, to accelerate the setting rate of the cement slurry. If the slurry contains a basic material, such as a carbonate, it will react with the acidic accelerating agent to foam the composition. Such compositions are described, for example, in U.S. Pat. No. 4,904,503.

In order to be suitable for such use, the slurries must possess a number of important properties. They must be able to hold a relatively large quantity of water such that they are sufficiently fluid to be pumped easily and to great heights. They must retain a consistency sufficient to prevent segregation or settling of ingredients and provide an adequate volume of applied fireproofing per weight of dry mix. The coating slurries, furthermore, must adhere to construction surfaces, such as a steel surface, both in the slurried state and after setting. Also, the slurry must set without the undue expansion or shrinkage, which could result in the formation of cracks that can deter from the insulative value of the coating.

A further factor that affects the formulation of the cement compositions is set time. The slurries must not set before application, yet must set quickly enough so that multiple layers can be applied in a reasonable period of time. To this end, as noted above, a set retarder is often included in the composition, and then an accelerating agent is added just prior to application, to ensure quick setting. Desirably, the set retarder is sufficient to prevent setting for about 4 to 8 hours, while adding the accelerating agent will then cause setting within 15 minutes.

Construction of buildings usually takes many months, and depending on the size of the building, the cement slurry will be applied over the course of many days. Usually the equipment for applying these compositions, including pumping systems, hoses, reservoirs, spray nozzles, etc., must be cleaned each night to prevent the cement slurry from setting inside the equipment.

BRIEF SUMMARY OF THE INVENTION

In one aspect, the invention is a cement composition, comprising a cement, a clay, an aggregate and/or a fibrous material, and a retarder.

In another aspect, the invention is a cement composition, comprising 35–85% by weight of a cement, 3–15% by weight of a clay, 1–50% by weight of an aggregate, and a retarder in an amount sufficient to prevent the cement composition, when mixed with water, from setting for at least 12 hours.

In another aspect, the invention is a method of spray-coating building materials, including coating a first cement composition onto building materials with equipment; placing inside the equipment a second cement composition; coating the second cement composition onto building materials with the equipment; and coating again the first cement composition onto building materials with the equipment.

In another aspect, the invention is a method of making a cement composition, comprising mixing together at least the following ingredients: 35–85% by weight of a cement, 3–15% by weight of a clay, 1–50% by weight of an aggregate and/or a fibrous material, and 0.2–5% by weight of a high efficiency retarder.

An advantage of the present invention is that the equipment used to apply the cement compositions need not be cleaned every night when used on a construction site.

Other objects, features, and advantages of the present invention will become apparent from the following detailed description. It should be understood, however, that the detailed description and the specific examples, while indicating embodiments of the invention, are given by way of illustration only, since various changes and modifications within the spirit and scope of the invention will become apparent to those skilled in the art from this detailed description.

DETAILED DESCRIPTION OF THE INVENTION

All amounts are in percentages by weight, based on the total weight of the composition prior to the addition of water, unless otherwise specified.

The cement compositions of the present invention include a binder (cement); a synthetic, organic, or mineral type aggregate; clay; and a set retarder. The amount of set retarder is sufficient to slow the setting process in slurries of the cement compositions so that it is not necessary to clean the application equipment overnight, yet not so much retarder is included to prevent quick setting once an accelerator is added.

The cement compositions are often supplied as factory-blended mixtures, in dry form, in bags. The dry composition is then mixed with water in a mechanical paddle mixer, ribbon mixer, continuous mixer, or other suitable mixer, to form a slurry. The slurry is then mechanically pumped using a piston, roto-stator or peristaltic pump through a hose to a nozzle where the slurry is dispersed using compressed air to the substrate (building materials such as steel). The area of application may be many stories high. Just prior to application, an accelerator, usually in liquid form, is sprayed into the composition (the accelerator itself being stored in its own reservoir, and supplied through its own hose. The accelerator is also usually supplied in dry form, and mixed with water on site.

The binder can be any cement, including gypsum, Portland cement, aluminous cement, or pozzolanic cement. Gypsum is preferred due to its advantageous fireproofing characteristics. (As used herein, the term "gypsum" includes plaster of Paris (non-hydrated) as present, for example, in the dry mix prior to water addition, as well as gypsum, per se (hydrated plaster of Paris). The binder may be used in an amount of 35 to 85% by weight, but is preferably present in an amount of 40 to 60% by weight, and more preferably 45 to 50% by weight.

Clay may be used to adjust the viscosity, by holding water. Examples of clays include both natural and synthetic clays. Preferred clays include swelling clays, more preferred montmorillonite clay, most preferred the clay is Bentonite clay, less preferred Kaolinite and China clay. Preferably, the amount of clay present is 3 to 15% by weight, more preferably 5 to 10% by weight.

Set retarders slow the rate at which the composition sets. These materials include basic material such as hydroxides; carbonates; phosphates, such as monosodium phosphate; citrates such as citric acid, sodium citrate and ammonium citrate; sodium gluconate; and aconitic; borax; tannic acid; calcium acetate; tartaric acid; proteins (for example keratin, casein and collagen) and protein mixtures prepared from biological sources (gelatin, glue, isinglass, egg albumen or ground horse hooves). A high-efficiency set retarder is a set retarder that extends the setting of gypsum to 12 hours or more, when present in an amount of 1% or less. An example of a high-efficiency set retarder is ground horse hooves. The amount of set retarder used depends on its ability to retard setting. The amount of set retarder should be sufficient to prevent setting in less than 12 hours. Preferably, the amount of set retarder should be sufficient to allow setting in 14 hours to 1 week, more preferably 16 to 96 hours, even more preferably 18 to 72, or 18 to 48 hours. The amount of set retarder may be 0.2 to 5% by weight, preferably, 0.5 to 1.0% by weight, more preferably 0.7 to 0.9% by weight, of the dry composition.

Accelerators may be acidic or non-acidic. Examples of acidic accelerators include aluminum sulfate, potassium aluminum sulfate, aluminum nitrate, ferric nitrate, ferric sulfate, ferric chloride, ferrous sulfate, zinc sulfate, sodium sulfate, cadmium sulfate, and potassium sulfate. Examples of non-acidic accelerators include ground gypsum, calcium chloride, sodium chloride, potassium chloride, potassium bromide, potassium nitrate, potassium perchlorate, potassium thiocyanate, potassium chromate, barium chloride, sodium nitrate, ammonium nitrate, sodium silicate and ammonium sulfate. Generally, an amount in the range of about 0.1% to 20% by weight is used. A preferred accelerator is QWIK-SET™ (alum) from ISOLATEK INTERNATIONAL of Stanhope, N.J.

In offsetting the set retardation of the slurry, acidic accelerator is generally consumed, and thus unavailable for reaction with the basic material. Accelerator concentrations in the range of 0.1% to 20% will generally provide an excess. With gypsum-based compositions, amounts in the range of about 0.5% to 10.0% are generally useful. A more preferred amount is 0.2 to 1%, when the accelerator is an acidic accelerator, while more than 1% may be desirable with a non-acidic accelerator. The optimal amount of accelerator is normally determined empirically.

Typically, the accelerator is a solid material that is dissolved in an appropriate solvent, preferably water, and the solution is introduced into the slurry. In general, concentrations in the range of about 10% to 50% by weight, based on the weight of the solution, are used. For example, a 50 lb. bag of QWIK-SET™ may be mixed with 12.5 gal. (100 lb.) of water.

The cement composition may also contain other additives and ingredients. Examples include air-entraining agents, fibrous materials, aggregate materials, and, less preferably, a basic material that may produce gas when mixed with acid. Other possible additions include fillers, dyes, pigments, fungicides, anti-microbial agents, and reinforcing fibers. A preferred composition for use in the invention comprises a gypsum binder, aggregate, an air entraining agent, a set retarder, clay and a fibrous component. Usually, antifoaming agents, such as silicone emulsions (for example, containing dimethyl polysiloxane), are not included in these compositions, since they provide an effect opposite that of air entraining agents.

Examples of aggregates includes vermiculite, perlite, glass beads, puffed glass, mineral strands, mineral rovings, mineral spheres, and polymers such as polyethylene, polypropylene and polystyrene, in shredded, puffed and foamed form. In general any non-biodegradable, environmentally stable material having a density of 0.5 to 20 lbs. per cubic foot may be used as an aggregate. Although the amount of aggregate can vary within wide limits, depending on the density of the aggregate, other materials present in the composition, and desired physical properties, it may be present in an amount of as little as 1% to as much as 50% by weight, preferably 25 to 35% by weight.

The basic materials that may produce gas when mixed with acid, can be a carbonate, bicarbonate, or other basic material capable of evolving a gas, usually carbon dioxide, upon reaction with an acid. The basic material reacts with the accelerator to cause gas evolution, and possibly volume expansion, prior to setting of the slurry. Compounds that can be used as the basic material include calcium carbonate (limestone), sodium carbonate, and sodium bicarbonate. Usually sufficient basic material is already present without addition, in an amount to achieve an expansion of up to 5% by volume.

In general, an amount of basic material in the range of 2% to 7% by weight is preferred. The basic material is usually provided as a naturally occurring material in the binder, such as naturally occurring calcium carbonate in gypsum.

The fibrous materials may be either organic or inorganic. Examples include cellulose, mineral wool, slag wool fibers, and glass fibers. The total amount of the fibrous material in the composition is preferably in the range of 1% to 50%, preferably, 4 to 10% by weight.

The air-entraining agents that can be used include sulfonated monoglycerides, sodium alkyl arylsulfonate, sodium laurel sulfate and sodium alpha-olefin sulfonates. Dry foaming agents can be incorporated into the dry composition before addition of water, while both dry and liquid agents can be added to the slurried composition. Preferred amounts of the air entraining agent are 0.001% to 1% by weight.

Examples of fillers include limestone, fly ash, sand and diatomaceous earth.

The cement compositions of the present invention may be used to spray-coat construction surfaces, such as steel beams. They may act as fireproofing compositions when so used. Furthermore, these composition can be used by running them through the equipment for applying cement (such as piston, rotor-stator or fireproofing pump, including pumping systems, hoses, reservoirs, pump hoppers, mixers spray nozzles, etc.), instead of cleaning out these system, when they will not be in use for a period of time, such as overnight. Systems of this type include the TOMPSEN PUTZMEISTER™.

The present invention will next be described in further detail by the following referential examples, examples and tests. It is however to be noted that the present invention is by no means limited to the following examples and tests.

EXAMPLES

Example 1

The following ingredients were mixed to form the cement composition of Example 1:

| Raw Materials | Weight (lbs.) | % by Wt. |
|---|---|---|
| Perlite | 8.18 | 14.40 |
| Vermiculite | 5.34 | 9.40 |
| Cellulose | 2.18 | 3.85 |
| Stucco Plaster | 35.22 | 62.01 |
| Bentonite Clay | 5.00 | 8.80 |
| Red Pigment | 0.23 | 0.40 |

-continued

| Raw Materials | Weight (lbs.) | % by Wt. |
|---|---|---|
| High Efficiency Set Retarder | 0.57 | 1.00 |
| Sodium Alpha-Olefin Sulfonate | 0.07 | 0.12 |
| Cunilate 98 (Copper-8-Quinolinolate) | 0.01 | 0.02 |
| | 56.80 | 100.00 |

This amount of material may be loaded into a bag for transport or storage. In order to form a slurry for use, the cement composition of Example 1 may be mixed with 13 or 14 gallons of water.

Example 2

The cement composition of Example 1 may be used as follows:

1. When the material pump hopper is nearly empty of the standard slurry, turn off the accelerator pump. Turn off the feed valve to the nozzle.
2. Mix 13 gallons (49 liters) of water per bag of the cement composition of Example 1 for two minutes to form an extended set slurry for overnight use. Mix 14 gallons (53 liters) of water per bag of the cement composition of Example 1 for two minutes to form an extended set slurry for 72 hr use.
3. Fill hopper with the extended set slurry. The product is tinted "light brick" for identification purposes.
4. Pump until "light brick" color is seen at the spray nozzle.
5. Scrape down the sides of the material pump hopper. Pump until the hopper is almost empty, then stop.
6. Cover the surface of the remaining slurry in the hopper with plastic sheeting. This will prevent evaporation.
7. Remove the nozzle orifice and completely submerge spray nozzle in a container of water.
8. Upon restart, prepare QWIK-SET™ accelerator solution in accordance with standard application instructions.
9. Remove the plastic sheeting on the pump hopper. Take the spray nozzle out of the water. Install nozzle orifice on spray nozzle.
10. Mix a batch of standard cement slurry and place into the pump hopper.
11. Begin pumping the slurry using QWIK-SET™ accelerator solution in accordance with the standard application instructions.
12. A thin coating of the standard cement slurry can be applied over the extended set product which has been sprayed to cover the tinted material.

Example 3

The following ingredients were mixed to form the cement composition of Example 3:

| Raw Materials | Weight (lbs.) | % by Wt. |
|---|---|---|
| Vermiculite | 12.28 | 22.10 |
| Cellulose | 2.13 | 3.85 |
| Stucco Plaster | 35.20 | 63.66 |

-continued

| Raw Materials | Weight (lbs.) | % by Wt. |
|---|---|---|
| Bentonite Clay | 4.90 | 8.85 |
| Red Pigment | 0.22 | .040 |
| High Efficiency Set Retarder | 0.55 | 1.00 |
| Sodium Alpha-Olefin Sulfonate | 0.07 | 0.12 |
| Cunilate 98 (Copper-8-Quinolinolate) | 0.01 | 0.02 |
| | 55.30 | 100.00 |

This amount of material may be loaded into a bag for transport or storage. In order to form a slurry for use, the cement composition of Example 3 may be mixed with 14 or 15 gallons of water.

Example 4

The cement composition of Example 3 may be used as follows:

1. When the material pump hopper is nearly empty of the standard slurry, turn off the accelerator pump. Turn off the feed valve to the nozzle.
2. Mix 14 gallons (53 liters) of water per bag of the cement composition of Example 3 for two minutes to form an extended set slurry for-overnight use. Mix 15 gallons (57 liters) of water per bag of the cement composition of Example 3 for two minutes to form an extended set slurry for 72 hr use.
3. Fill hopper with the extended set slurry. The product is tinted "light brick" for identification purposes.
4. Pump until "light brick" color is seen at the spray nozzle.
5. Scrape down the sides of the material pump hopper. Pump until the hopper is almost empty, then stop.
6. Cover the surface of the remaining slurry in the hopper with plastic sheeting. This will prevent evaporation.
7. Remove the nozzle orifice and completely submerge spray nozzle in a container of water.
8. Upon restart, prepare QWIK-SET™ accelerator solution in accordance with standard application instructions.
9. Remove the plastic sheeting on the pump hopper. Take the spray nozzle out of the water. Install nozzle orifice on spray nozzle.
10. Mix a batch of standard cement slurry and place into the pump hopper.
11. Begin pumping the slurry using QWIK-SET™ accelerator solution in accordance with the standard application instructions.
12. A thin coating of the standard cement slurry can be applied over the extended set product which has been sprayed to cover the tinted material.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A cement composition, comprising:
   (a) 35–85% by weight of a cement,
   (b) 3–15% by weight of a swellable clay,
   (c) 1–50% by weight of at least one member selected from the group consisting of an aggregate and a fibrous material, and
   (d) 0.7–1.0% by weight of a high efficiency retarder.

2. The cement composition of claim 1, comprising:
   (a) 40–60% by weight of said cement,
   (b) 7–10% by weight of said clay,
   (c) 25–35% by weight of said at least one member, and
   (d) 0.7–1.0% by weight of said high efficiency retarder.

3. The cement of claim 2, wherein the cement composition, when mixed with water, will not set for at least 12 hours.

4. cement of claim 3, wherein the cement composition, when mixed with water, will set in 14 to 96 hours.

5. A cement composition, comprising:
   (a) 35–85% by weight of a cement,
   (b) 3–15% by weight of a swellable clay,
   (c) 1–50% by weight of at least one member selected from the group consisting of an aggregate and a fibrous material, and
   (d) a retarder, in an amount sufficient to prevent the cement composition, when mixed with water, from setting for 12 hours to one week.

6. The cement of claim 5 wherein the cement composition, when mixed with water, will set in 14 to 96 hours.

7. The cement composition of claim 6, comprising:
   (a) 40–60% by weight of said cement,
   (b) 7–10% by weight of said clay,
   (c) 25–35% by weight of said at least one member, and
   (e) an air entraining agent.

8. The cement composition of claim 7, wherein a basic material is present in said cement in an amount sufficient to cause expansion of said cement composition of at most 5%, when mixed with an acidic accelerator.

9. The cement composition of claim 7, wherein said cement is plaster.

10. The composition of claim 7, wherein said retarder comprises protein.

11. A method of coating building materials, comprising:
    coating a first cement composition onto building materials with equipment followed by;
    placing inside said equipment a second cement composition followed by;
    coating said second cement composition onto building materials with said equipment followed by;
    placing inside said equipment said first cement composition followed by;
    coating said first cement composition onto building materials with said equipment;
    wherein said second cement composition is the cement composition of claim 5.

12. The method of claim 11, wherein said second cement composition will set in 14 to 96 hours.

13. A method of making a cement composition, comprising mixing together at least the following ingredients:
    (a) 35–85% by weight of a cement,
    (b) 3–15% by weight of a swellable clay,
    (c) 1–50% by weight of at least one member selected from the group consisting of an aggregate and a fibrous material, and
    (d) 0.7–1.0% by weight of a high efficiency retarder.

14. The method of claim 13, comprising mixing together at least the following ingredients:
    (a) 40–60% by weight of said cement,
    (b) 7–10% by weight of said clay,
    (c) 25–35% by weight of said at least one member,
    (d) 0.7–0.9% by weight of said high efficiency retarder, and
    (e) an air entraining agent;
    wherein no additional basic material is mixed into said cement composition.

15. The cement composition formed by the method of claim 13.

16. The cement composition formed by the method of claim 14.

17. The cement composition of claim 16, wherein said cement composition will set in 14 to 96 hours.

18. The method of claim 11, wherein said coating is spray-coating.

* * * * *